May 3, 1927.
B W. TWYMAN ET AL
1,626,893
AUTOMOBILE BODY VENTILATING SYSTEM
Filed Sept. 11, 1924
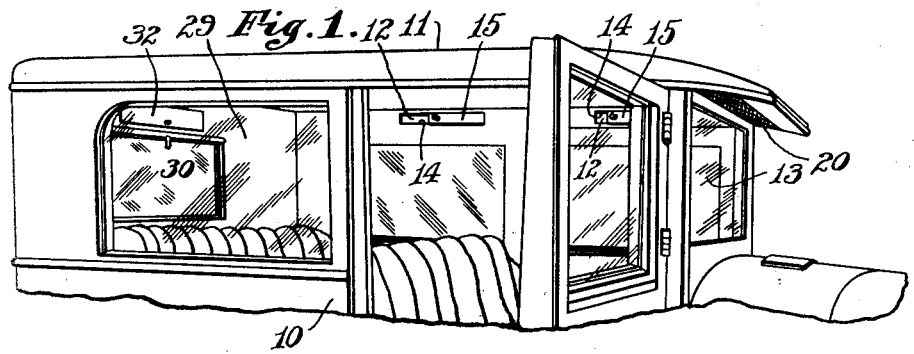
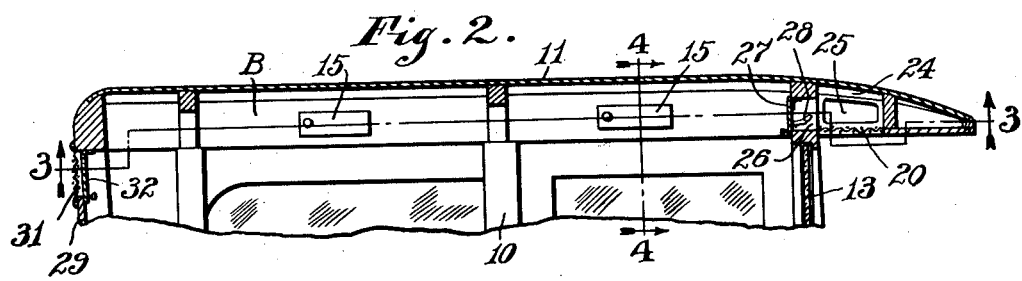
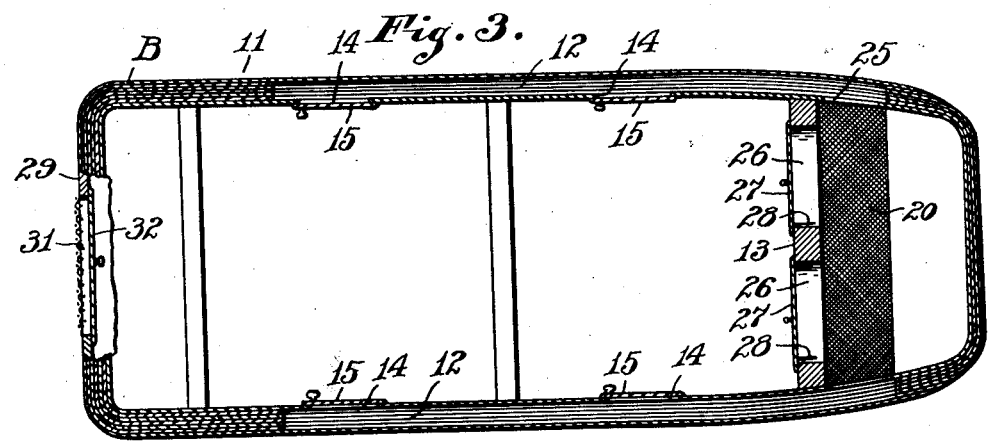
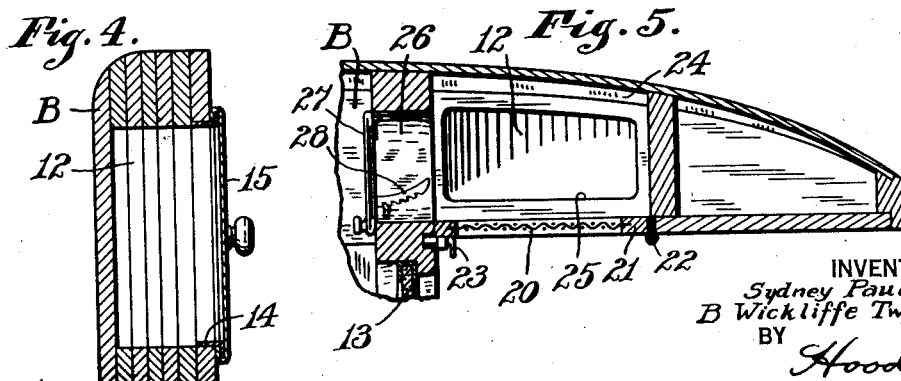
INVENTORS
Sydney Paul and
B Wickliffe Twyman,
BY
Hood + Hahn.
ATTORNEYS Patented May 3, 1927.

1,626,893

UNITED STATES PATENT OFFICE.

B WICKLIFFE TWYMAN, OF MARYSVILLE, MICHIGAN, AND SYDNEY PAUL, OF LIMA, OHIO.

AUTOMOBILE BODY-VENTILATING SYSTEM.

Application filed September 11, 1924. Serial No. 737,063.

The object of our invention is to provide improved means for ventilating closed bodies of automobiles.

The accompanying drawings illustrate our invention:

Fig. 1 is a fragmentary perspective of a closed automobile body embodying our invention.

Fig. 2 is a fragmentary vertical section;
Fig. 3 is a section on line 3—3 of Fig. 2;
Fig. 4 is a transverse section on line 4—4 of Fig. 2;
Fig. 5 is a longitudinal vertical section of the upper forward end of the body.

In the drawings 10 indicates the closed body of an automobile formed in part by a roof structure 11 in which are formed longitudinal air passages 12, 12 leading rearwardly from a point in front of the front wall 13 which is preferably, although not necessarily, a fixed wall integral with the closed superstructure, rather than an adjustable wind shield.

In practice channels 12 are formed in an endless laminated bow B by omitting intermediate portions of the laminations, as shown in Fig. 4, the inner walls of these channels being perforated at appropriate points, as at 14, and coverable by sliding plates or valves 15.

The forwardly projecting portion of the canopy or roof, lying forward of the front face of glass wall 13 is provided, preferably immediately adjacent the forward face of wall 13, with a screened opening 20 which is most conveniently formed in a swinging frame 21 hinged at 22 in the canopy, and normally retained in place by catch 23, the screen 20 giving access into an air chamber 24 formed in the cavity and communicating with openings 25 leading into the forward ends of passages 12.

The lintel or top of the frame for glass 13 is perforated at one or more points 26 so as to form a passage, or passages, from air chamber 24 into the forward upper corner of the interior of the body and each opening is controlled by an upwardly swinging door or valve 27 which may be held in any desired position of adjustment 28 so as to direct a current of air upon the laps of persons in the front seat, but so as to avoid a direct blast on the face or head.

In the rear wall 29, above window 30, we provide a screened opening 31 controlled by a suitable slide or valve plate 32, the arrangement being such that, by an appropriate adjustment of valves 15, 27 and 32 any desired circulation of air within the body of the car may be obtained.

We claim as our invention:

1. The combination with a closed body of an automobile having a top canopy extending forwardly in front of the front wall and an air chamber formed in said canopy and communicating with the space in front of and adjacent said front wall, of air conduits leading rearwardly from said chamber and opening into the interior of the closed body, an air conduit leading from said air chamber into the upper forward corner of the closed body.

2. The combination with a closed body of an automobile having a top canopy extending forwardly in front of the front wall and an air chamber formed in said canopy and communicating with the space in front of and adjacent said front wall, of air conduits leading rearwardly from said chamber and opening into the interior of the closed body, an air conduit leading from said air chamber into the upper forward corner of the closed body, and means for controlling air flow through said conduits.

3. The combination with a closed body of an automobile having a top canopy extending forwardly in front of the front wall and an air chamber formed in said canopy and communicating with the space in front of and adjacent said front wall, of air conduits leading rearwardly from said chamber and opening into the interior of the closed body, an air conduit leading from said air chamber into the upper forward corner of the closed body, the rear wall of said body having an opening leading therethrough at the upper rear corner, and means for controlling air flow through said conduits and opening.

In witness whereof, we have hereunto set our hands respectively at Indianapolis, Indiana, and Portland, Indiana, this 18th day of July, and 22nd day of July, 1924.

B WICKLIFFE TWYMAN.
SYDNEY PAUL.